M. LUCE.
VEHICLE BRAKE.
APPLICATION FILED JULY 21, 1914.
1,212,781.
Patented Jan. 16, 1917.
2 SHEETS—SHEET 1.
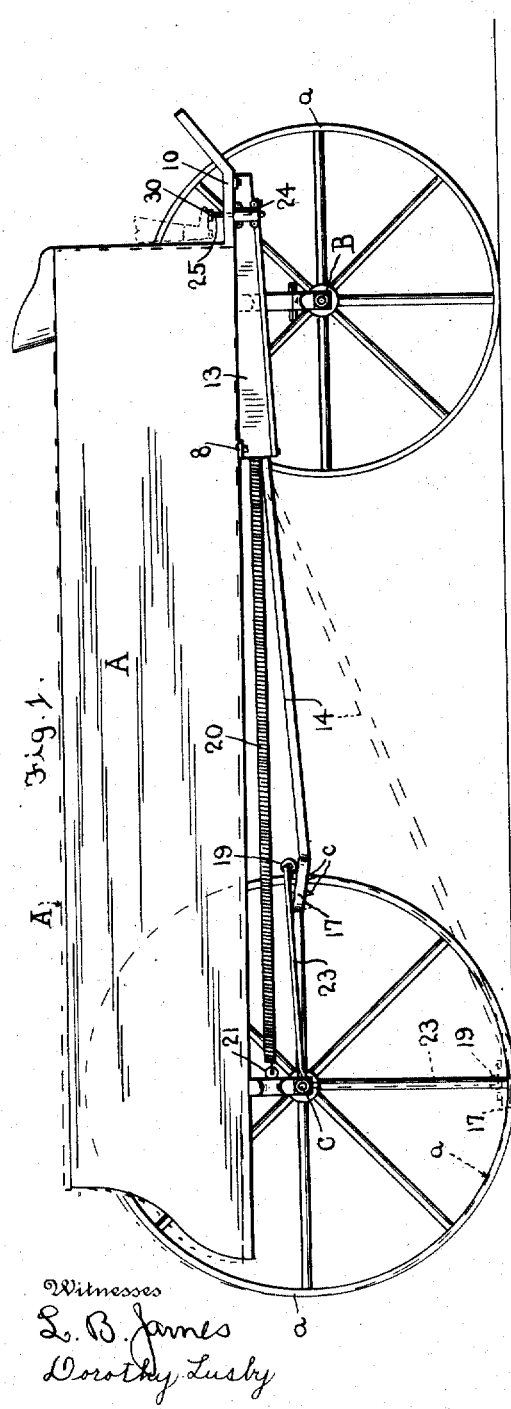
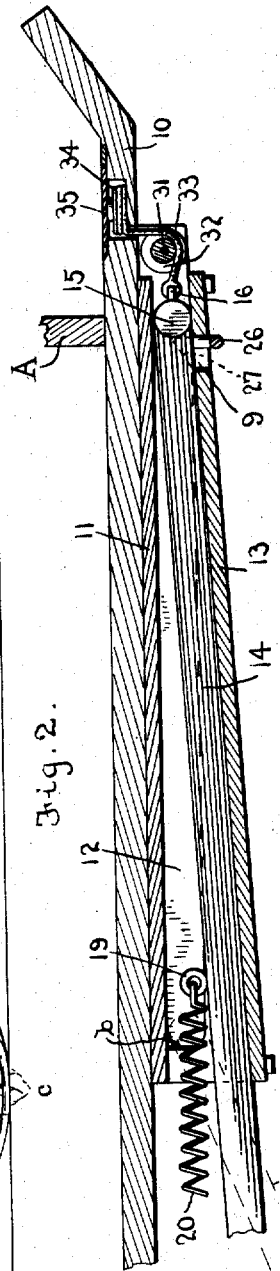
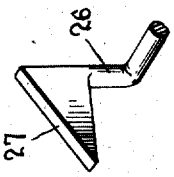
Witnesses
L. B. James
Dorothy Lusby
Inventor
Moses Luce
By Geo. W. Lues
Attorney

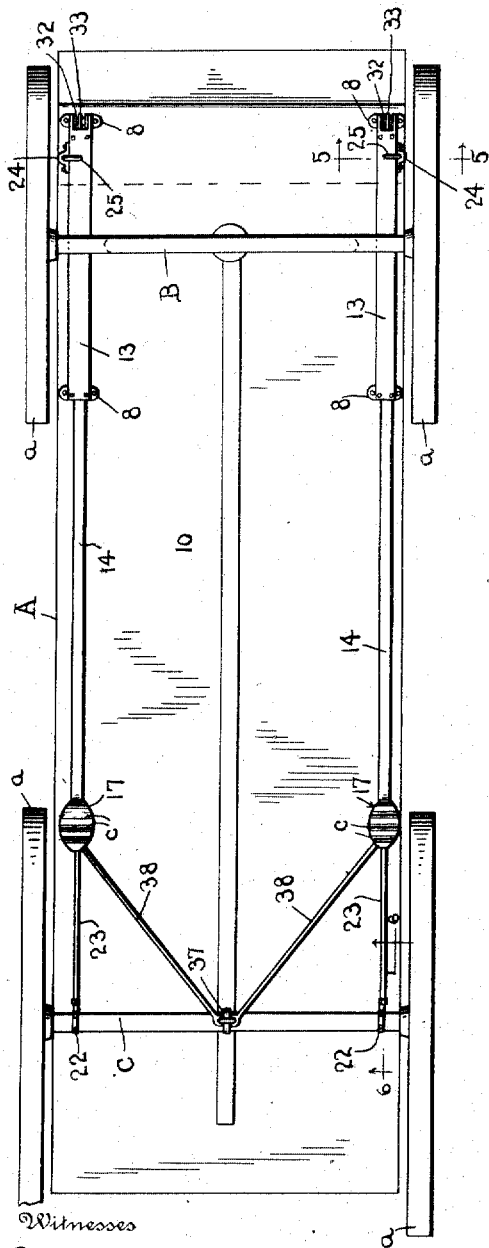
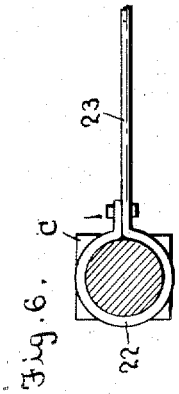
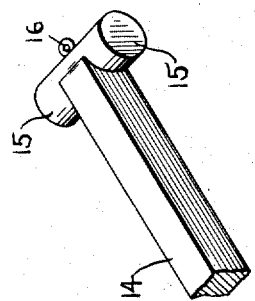
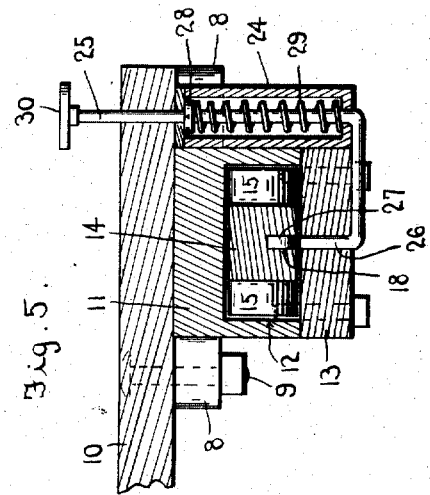
M. LUCE.
VEHICLE BRAKE.
APPLICATION FILED JULY 21, 1914.
1,212,781.
Patented Jan. 16, 1917.
2 SHEETS—SHEET 2.
Inventor
Moses Luce

UNITED STATES PATENT OFFICE.

MOSES LUCE, OF ELLINGTON, NEAR SINCLAIRVILLE, NEW YORK.

VEHICLE-BRAKE.

1,212,781.  Specification of Letters Patent.  Patented Jan. 16, 1917.

Application filed July 21, 1914. Serial No. 852,222.

*To all whom it may concern:*

Be it known that I, MOSES LUCE, a citizen of the United States, and a resident of the town of Ellington, near the village of Sinclairville, in the county of Chautauqua and State of New York, have invented certain new and useful Improvements in Vehicle-Brakes, of which the following is a specification, reference being had to the accompanying drawings, forming part of this specification.

My invention has for its object to provide a vehicle with an emergency brake so arranged that the same may be instantly thrown into operation without straining any part of the vehicle.

Another object of my invention is to provide a vehicle with an emergency brake, which when thrown into working position will raise and support the rear end of the vehicle, the load being carried upon two brake shoes which are dragged upon the ground.

With these and other objects in view the present invention consists in the combination and arrangement of parts as will be hereinafter more fully described and finally pointed out in the appended claims, it being further understood that changes in the specific structure shown and described may be made within the scope of the claims, without departing from the spirit of the invention.

In the accompanying drawings forming a part of this specification, and in which like numerals of reference indicate similar parts in the several views: Figure 1 shows a side elevational view of a vehicle provided with a brake embodying my invention. Fig. 2 is an enlarged sectional view of the housing showing the detent in operative position. Fig. 3 shows a perspective view of the detent. Fig. 4 shows a bottom view of Fig. 1. Fig. 5 is a section on line 5, 5, of Fig. 4. Fig. 6 is a section on line 6, 6, of Fig. 4. Fig. 7 shows a detail of the drag bar and its connected trunnions.

In the accompanying drawings the letter A designates a vehicle provided with a front axle B, and a rear axle C, provided with the vehicle wheels *a*.

Secured to the bottom 10, of the vehicle is a housing 11, the sides of which are provided with parallel extending channels or grooves 12. The bottom 13 of the housing is provided with an opening 9. This housing is secured to the underface of the bottom 10 of the wagon or vehicle, as shown in Fig. 2.

Slidably held within the housing 11, is a drag bar 14, the forward end of which is provided with the trunnions 15 and eye 16 which extends from the trunnions, as shown in Fig. 7. These trunnions 15 are arranged to slide within the channels or grooves 12, these channels ending in the stop shoulder *b*, these stop shoulders *b* being engaged by the trunnions and limiting the excursion of the drag bar. At the remaining end each drag bar 14 ends in a brake shoe 17, these brake shoes preferably being provided with spurs *c*, shown in Fig. 1. These spurs however, are not necessary.

Near its forward end the drag bar 14 is provided with a socket 18 and near its opposite end with an eye 19. As shown in Fig. 4, these drag bars 14 and housings 11 are disposed in sets of twos, though each works separate and independent. Secured to each eye 19 is a coil spring 20, these springs being secured at their other ends to a suitable eye 21 fixed to any suitable part of the vehicle.

Secured in any suitable manner to the rear axle C of the vehicle A is a collar 22, each collar forming part of a supporting bar 23, each supporting bar at its other end being pivotally secured to one of the eyes 19 extending from the brake shoes 17. These collars 22 are loosely secured to the axle C and each bar 23 is arranged to swing from a horizontal position downward into a vertical position. The length of each supporting bar 23 is greater than the radii of the rear wheels for a purpose to be set forth later on.

Held within a boxing 24 secured adjacent to the housing 11 is a releasing member in the form of an L-shaped bar having a long leg 25 and a short leg 26, the short leg 26 ending in the wedge-shaped detent 27. As shown in Fig. 5 the member 25 is provided with a collar 28 and working against this collar is a spring 29 to normally force this member 25 which is provided with the head 30 upward. In its upward position, the detent 27 is within the socket 18 to hold the drag bar 14 in a retracted position. Held between the sides of the housing 11 is a pin 31 carrying a shive 32 over which passes a pliable member 30 having one end secured to the eye 16 and the opposite end coiled within an opening 34 formed within the bottom 10, this opening normally being closed by means of the plate 35. As shown in Fig. 5, the housing 11 is provided with ears 8 through which suitable bolts 7 pass which are employed to hold the housing to the vehicle.

Secured to a suitable shackle 37 secured to the vehicle are two similar brace rods 38, these brace rods having their outer ends secured to the eyes 19 forming a part of the brake shoes 17, this construction being best shown in Fig. 4.

As explained, these emergency brakes are secured to a vehicle in sets of twos.

The operation is as follows: On setting the brake members, the drag bars 14 are shoved into the housings against the tension of the springs 20 until the detent 27 finds a setting within its socket 18. The rounded end of the trunnions 15 insures the detent being forced downward against the tension of the spring 20 in finding its way into the socket. In referring to Fig. 2, it will be noticed that the distance between the top of the housing 11 and the bottom 13 thereof is approximately that of the trunnions 15, but that the housing gradually widens vertically toward the outer end so that there is ample room for the eye 19 and spring 20 within the largest end of the housing.

In the retracted position of the drag bars, as shown in Fig. 1 the supporting bars 23 are held in a horizontal position, the bars 14 being held against the tension of the springs 20. As soon as it is found necessary to bring the emergency brake into play, it is simply necessary for the operator to press his foot upon the head 30, which results in the detent escaping from its socket, the springs 20 then promptly drawing out the drag bars which are drawn outward until the trunnions encounter the stop shoulders $b$. In this position, the supporting bars 23 are in a vertical position, as shown in Fig. 1 in dotted lines, in which position the rear part of the vehicle is supported and carried by the bars 23 the rear wheels $a$ being raised from the ground. It may be readily understood then that with the brake shoes in frictional contact with the earth that the advance of the vehicle will be instantly checked and finally entirely stopped.

In order to draw the bars 14 into the housing again, the operator simply grabs the pliable member 34 and pulls upon the same until the detent again finds seating within the socket.

By this means the vehicle is provided with an emergency brake which is simple of construction and positive of operation, and which can be thrown into working position with ease, accuracy and despatch.

Having thus described my said invention what I claim as new and desire to secure by U. S. Letters Patent is:

1. An emergency brake including in combination, a housing, a drag bar having one end slidably held within said housing, a stop to limit the excursion of said drag bar, a detent to hold said bar in said housing, and a supporting bar pivotally securing one end to said drag bar, all arranged as and for the purpose set forth.

2. An emergency brake including in combination with a vehicle, a housing, a drag bar having one end slidably held within said housing, a stop to limit the excursion of said bar, a detent to hold said bar within said housing, a spring exerting a force to normally withdraw said bar from said housing, a swinging supporting bar pivotally secured to said vehicle at one end the remaining end being secured to said drag bar, and means to force said drag bar into engagement with said detent.

3. An emergency brake including in combination, a housing, a drag bar having one end slidably held within said housing, a stop to limit the excursion of said drag bar, a detent to hold said bar within said housing, a spring exerting a force to normally withdraw said bar from said housing, and a swinging supporting bar pivotally secured at one end to said drag bar, all arranged substantially as and for the purpose set forth.

4. An emergency brake including in combination with a vehicle, a housing, a drag bar having one end slidably held within said housing, a stop to limit the excursion of said bar, a detent to hold said bar within said housing, a spring exerting a force to normally withdraw said bar from said housing, a swinging supporting bar pivotally secured to said vehicle at one end the remaining end being secured to said drag bar, and a pliable member secured to said drag bar to force the same into engagement with said detent.

5. The combination with a vehicle body and its rear axle, of a housing secured to said vehicle body including a channel, a drag bar having an outstanding trunnion arranged to slide within said channel, a detent within said housing to hold said drag bar in retracted position, a spring normally forcing said bar outward, a swinging supporting bar secured to said rear axle, at one end, the other end being secured to said drag bar, the length of said swinging supporting bar being greater than the radii of the wheels carried by said axle.

In testimony whereof I affix my signature, in the presence of two witnesses.

MOSES LUCE.

Witnesses:
CARL REX CROSBY,
WALTER H. EDSON.

Copies of this patent may be obtained for five cents each, by addressing the "Commissioner of Patents, Washington, D. C."